United States Patent [19]
Abel et al.

[11] Patent Number: 5,987,203
[45] Date of Patent: Nov. 16, 1999

[54] DISTRIBUTION MODULE FOR OPTICAL COUPLINGS

[75] Inventors: John N. Abel, Avon, Ind.; Paul F. Kolesar, Middletown, N.J.; Richard M. Flynn, Noblesville, Ind.; Daniel L. Stephenson, Lilburn, Ga.

[73] Assignee: Lucent Technologies Inc., Murray Hill, N.J.

[21] Appl. No.: 08/947,598

[22] Filed: Oct. 9, 1997

[51] Int. Cl.⁶ ..................................................... G02B 6/36
[52] U.S. Cl. .............................. 385/51; 385/134; 385/139
[58] Field of Search ..................... 385/51–72, 134–135, 385/136–139

[56] References Cited

U.S. PATENT DOCUMENTS

| | | | |
|---|---|---|---|
| 4,934,785 | 6/1990 | Mathis et al. | 350/96.21 |
| 5,212,752 | 5/1993 | Stephenson et al. | 385/78 |
| 5,274,729 | 12/1993 | King et al. | 385/134 |
| 5,386,487 | 1/1995 | Briggs et al. | 385/59 |
| 5,613,025 | 3/1997 | Grois et al. | 385/53 |
| 5,717,810 | 2/1998 | Wheeler | 385/135 |
| 5,764,843 | 6/1998 | Macken et al. | 385/135 |
| 5,778,130 | 7/1998 | Walters et al. | 385/134 |
| 5,838,858 | 11/1998 | White | 385/76 |

*Primary Examiner*—Rodney Bovernick
*Assistant Examiner*—Ellen E. Kang

[57] ABSTRACT

A distribution module for use in a traditional electrical panel that provides coupling functionality for optical and electrical connectors. The distribution module is comprised of a housing with a passage defined therein. The distribution module further includes high density, modular coupling strips, which are chosen based on the type of connectors to be coupled. These coupling strips are joined together and then secured in the passage formed in the housing. Once assembled, the distribution module is received into an opening in the panel thereby integrating both optical and electrical couplers in a single panel.

18 Claims, 14 Drawing Sheets

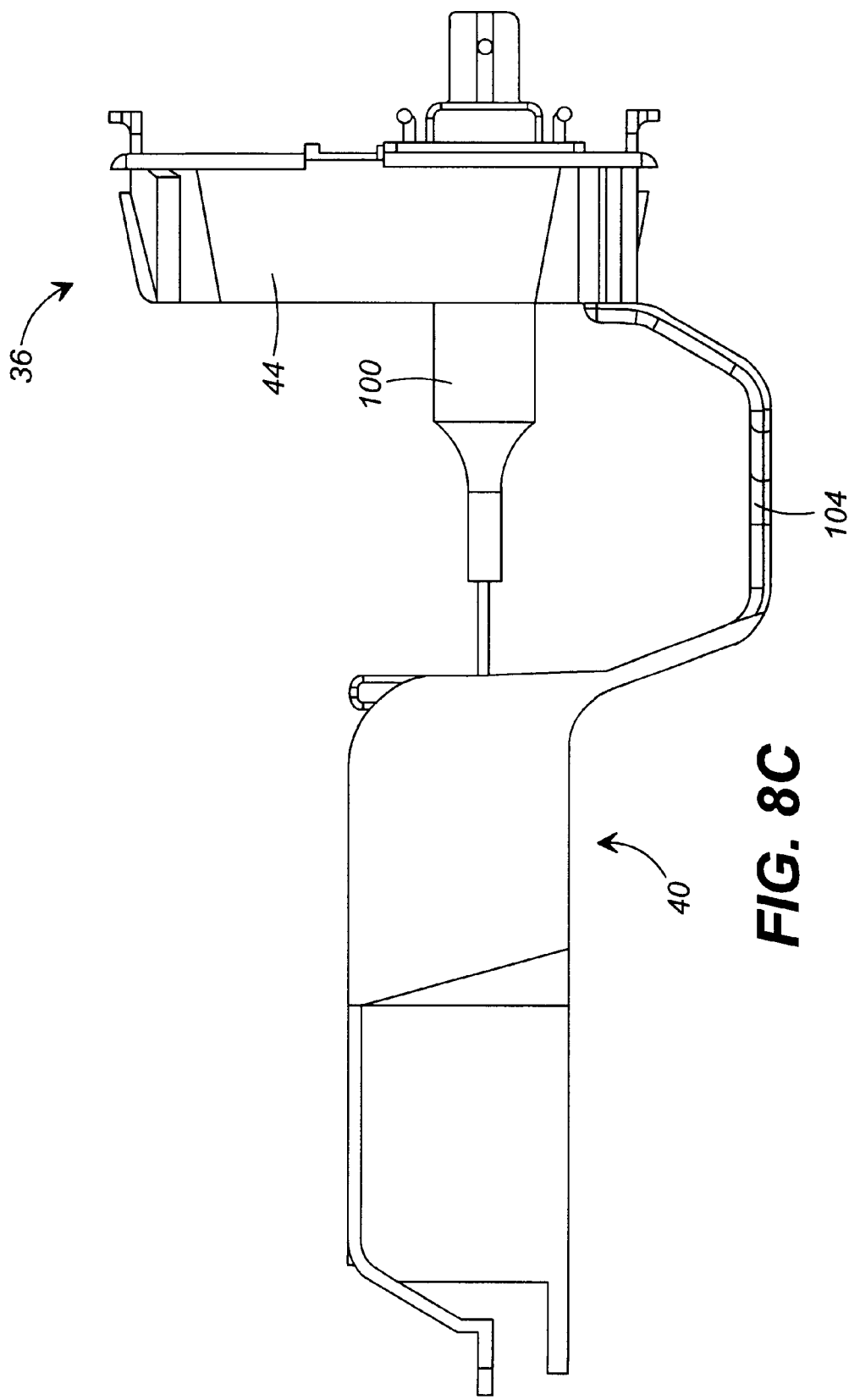

DISTRIBUTION MODULE FOR OPTICAL COUPLINGS

BACKGROUND OF THE INVENTION

1. Field of the Invention

The present invention relates generally to the field of optical fiber distribution systems, and more particularly to a distribution module that can be used in an electrical panel to facilitate multi-fiber connections and to integrate optical and electrical couplers onto a single panel.

2. Description of Related Art

Couplings for optical fiber transmission systems are known in the art. Often times it becomes necessary to arrange a plurality of optical fiber couplings in a panel to facilitate multi-fiber connections. These panels are typically found in telecommunications closets where connections are made between cables by patching one cable connector to another. Desirably, devices for holding couplings are mounted in the panel, but the couplings themselves are not connected to incoming or outgoing fiber paths until actually needed to provide service.

Optical couplings come in a variety of types, each having a unique interface designed to mate with an optical fiber connector of like type. One frequently used coupling is referred to as an ST® coupling, which is disclosed, for example, in U.S. Pat. No. 4,934,785 to Mathis et al. ST is a registered trademark of Lucent Technologies, Inc. Another common type of optical fiber coupling is the SC type coupling that is shown and described in U.S. Pat. No. 5,212,752 to Stephenson et al. Other types of optical fiber couplings include the FC type coupling and the LC type coupling. U.S. Pat. No. 5,274,729 to King et al. shows examples of couplings for the ST, SC and the FC types of couplings.

Heretofore, coupling systems for panels used individual or duplex couplings for making connections between the fiber optic cables. These systems do have their drawbacks, however. Depending on the application, the number of couplings used in an optical cable panel may number in the hundreds or even thousands resulting in a very time consuming assembly process for the panel. With such a large number of individual or duplex coupling locations, a technician's job in making the appropriate connections can be complicated. Moreover, because optical couplings have unique physical designs, they are often relatively expensive to manufacture.

In addition, panels have traditionally been designed to furnish either optical coupling functionality or electrical coupling functionality. This dichotomy is driven in primary part by the physical design of the panels. Electrical panels are generally designed with elongated rectangular openings for receiving electrical coupling apparatus that terminates a plurality of electrical connectors. Conversely, optical panels are generally designed with small openings that receive either a single or duplex optical coupler. It is therefore desirable to integrate both optical and electrical couplers in a single panel to make best use of space in a telecommunications closet rather than dedicating panels on an optical versus electrical basis.

Accordingly, there exists a need for a high density, distribution module that provides coupling functionality for a plurality of fiber optic connectors and is more cost efficient to assemble and manufacture than individual coupling systems. Moreover, the distribution module should be designed for use in a traditional electrical panel so that both electrical and optical couplers can be integrated onto a single panel.

SUMMARY OF THE INVENTION

Certain objects, advantages and novel features of the invention will be set forth in the description that follows and will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a distribution module for use in a traditional electrical panel that provides coupling functionality for both optical and electrical connectors. The distribution module is comprised of a housing with a passage defined therein. The distribution module further includes high density, modular coupling strips, which are chosen based on the type of connectors to be coupled. These coupling strips are joined together and then secured in the passage formed in the housing. Once assembled, the distribution module is received into an opening in the panel thereby integrating both optical and electrical couplers in a single panel.

A slack tray can be attached to the housing that spools and offers strain relief to the buffered fiber, which is particularly vulnerable when stripped of its outer jacket. The drum radius on which the fiber is spooled is appropriately chosen to satisfy any minimum bend radius requirements of the fiber manufacturer.

To reduce both manufacturing and assembly costs, the distribution module can be used with coupling strips in which like types of strips are interchangeable. Moreover, the coupling strips used in the distribution module are high density, which again offers a manufacturing and assembly cost advantage over simplex and duplex optical coupling systems known heretofore.

Alternatively, a second type of coupling strip arrangement can be used in which a cap coupling strip and a base coupling strip are defined. Advantageously, the cap coupling strip and the base coupling strip are designed to snap together and separate via operation of attachment clips allowing the strips to be cleaned in the field if necessary.

For maintenance purposes, a retainer can be used to mount the entire distribution module, including the slack tray, on the front side of the panel. This feature is particularly useful when access to the back side of the panel is limited or for applications that require frequent reconfiguration of the connectors.

The distribution module housing provides an informative human interface by including both a labeling region and an icon region where a technician can insert a labeling strip or icons to identify the individual connectors.

Additional advantages will become apparent from a consideration of the following description and drawings:

BRIEF DESCRIPTION OF THE DRAWINGS

FIG. 8C is an elevation view of the slack tray installed in the distribution module.

DESCRIPTION OF THE PREFERRED EMBODIMENT

Figure 1:
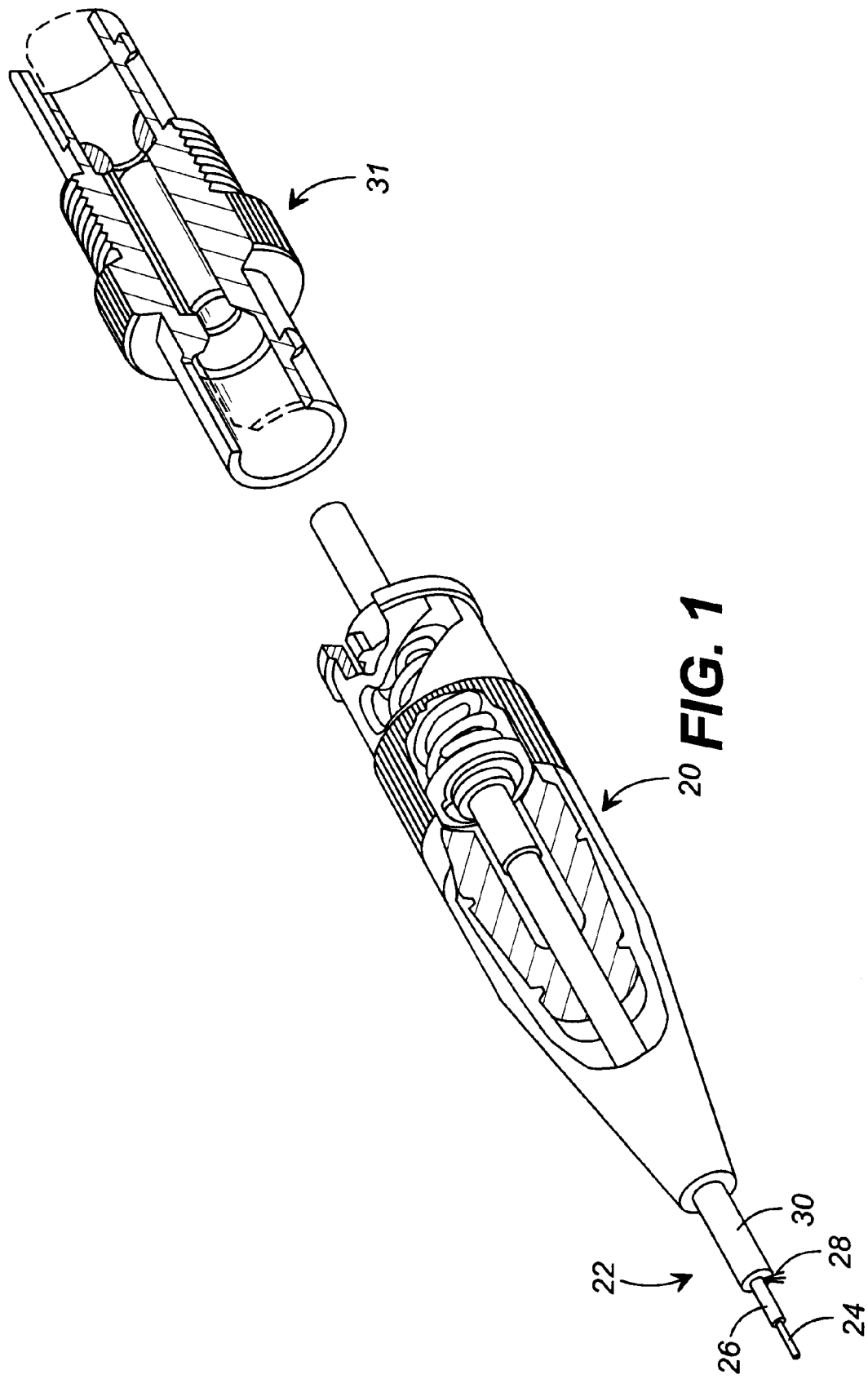
FIG. 1 is a perspective view of a fiber optic cable terminated by an ST connector and a fiber optic coupler.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Referring now to FIG. 1, an ST connector 20 is shown terminating optical cable 22. Optical cable 22 includes an optical fiber 24, which is comprised of a core and a cladding surrounded by one or more layers of an acrylate coating material for protection. Additionally, optical fiber 24 may be surrounded by a layer of polyvinyl chloride (PVC) to provide what is referred to as a buffered fiber 26. Further, a sheath system is shown, illustratively comprising strength members 28 made from aramid fibrous material and an outer jacket 30 made from PVC. Together, these elements form an optical cable 22 that has excellent transmission and handling characteristics, but which cannot be joined to other optical equipment without a connecting arrangement. For that purpose, another optical connector, such as ST connector 20, and an optical coupler, such as ST coupler 31, are needed.

Figure 2A:
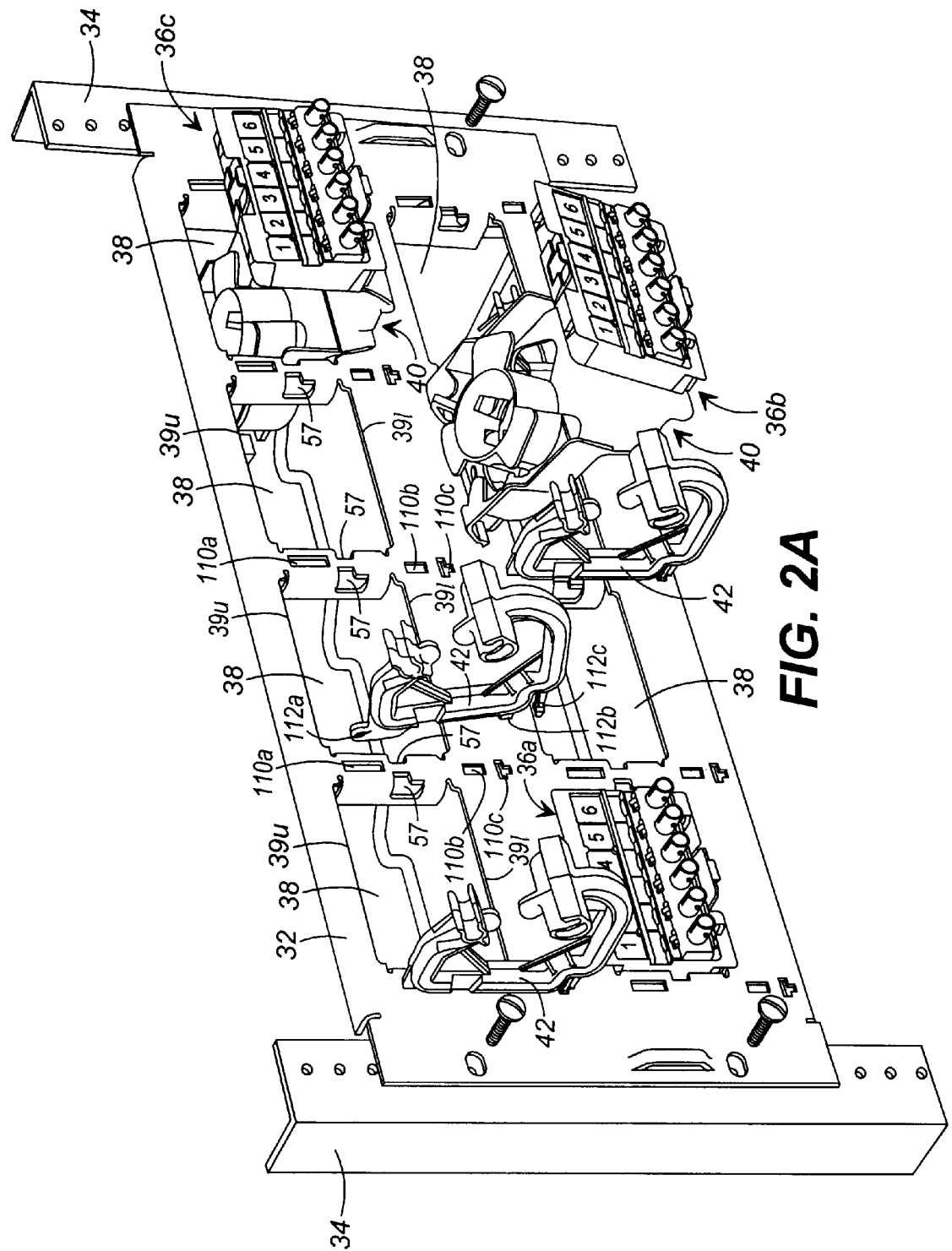
FIG. 2A is a perspective view illustrating the installation of distribution modules for optical couplings on an electrical cable panel according to the instant invention.
Figure 2B:
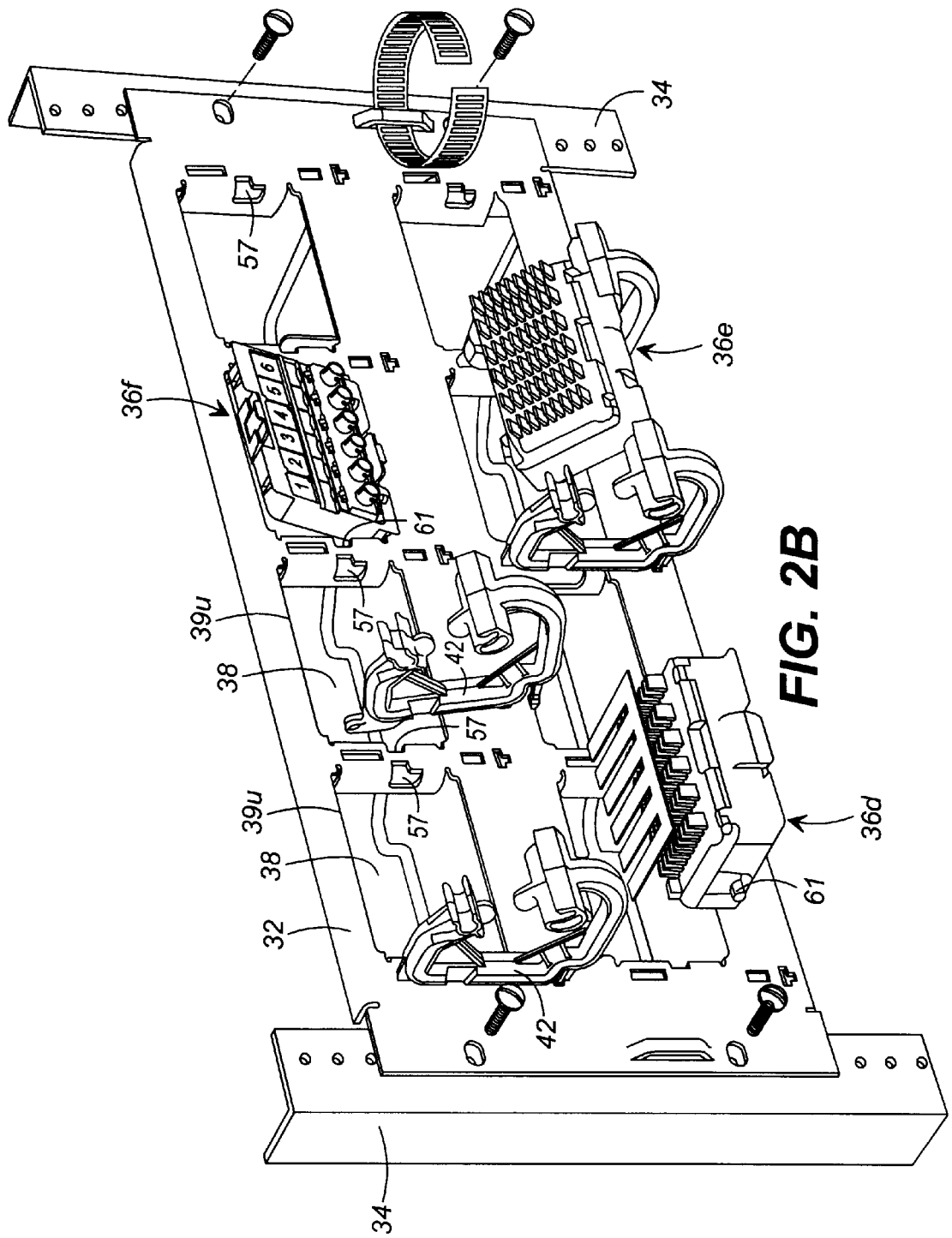
FIG. 2B is a perspective view illustrating the installation of distribution modules for electrical couplings on an electrical cable panel according to the instant invention.

An exemplary distribution module for coupling optical connectors to one another is illustrated in FIG. 2A. As discussed hereinbefore, optical or electrical cable panels, such as panel 32, are commonly installed on a frame 34 or rack in a communications closet to provide coupling functionality for a plurality of jumper cables to facilitate multi-fiber or multi-wire connections. However, rather than using an optical panel filled with a multitude of simplex or duplex optical couplers, distribution modules 36a,b,c are used with electrical panel 32 to provide high density, optical coupling functionality in a single module. In the preferred embodiment, panel 32 contains a plurality of substantially rectangular openings 38 for receiving distribution modules 36a,b,c. Openings 38 can be filled with distribution modules, which can be used to provide optical coupling functionality, as shown in FIG. 2A by distribution modules 36a, 36b and 36c, or electrical coupling functionality as shown in FIG. 2B by distribution modules 36d, 36e and 36f. Thus, through the use of distribution modules, both optical and electrical couplers can be integrated onto a single panel. FIGS. 2A and 2B illustrate distribution modules in various stages and modes of installation for both optical coupling and electrical coupling respectively. For example, in FIG. 2A, distribution module 36a is fully received and secured in panel 32; distribution module 36c, with an accompanying slack tray 40, is shown in the process of being received and secured in panel 32; and distribution module 36b is shown in an alternative installation mode with both the distribution module 36b and slack tray 40 mounted on retainers 42 on the front of panel 32. The benefits of a front panel installation via retainers 42 will be discussed more fully hereinafter.

Figure 3A:
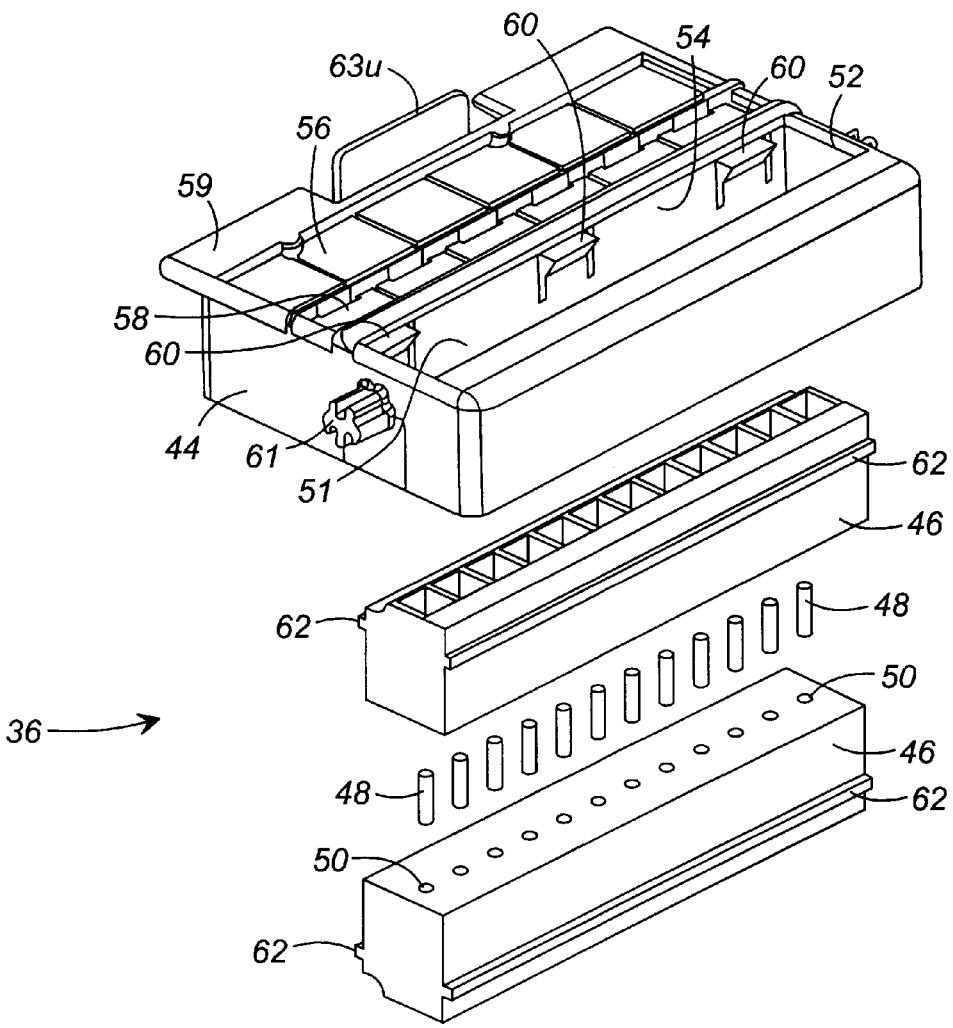
FIG. 3A is an exploded, perspective view illustrating a distribution module using LC coupling strips.
Figure 3B:
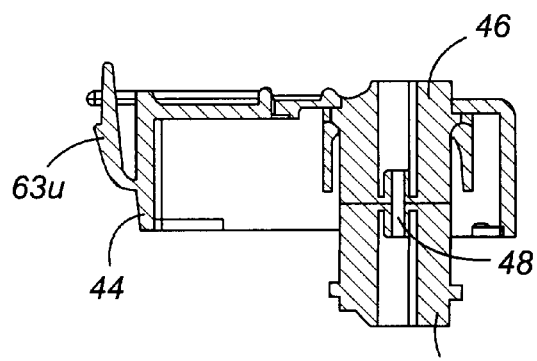
FIG. 3B is a cross-sectional view of a distribution module with LC coupling strips installed.

The distribution module is designed to provide coupling functionality for an array of connector types through use of interchangeable, optical coupling strips. Referring now to FIG. 3A, distribution module 36 is shown to comprise a housing 44, LC coupling strips 46 and alignment sleeves 48. LC coupling strips are symmetrical and have a plurality of holes 50 defined therein for receiving alignment sleeves 48. Alignment sleeves 48 are disposed in holes 50 and are entrapped as coupling strips 46 are joined together as shown in FIG. 3B. Sleeves 48 are used to align the ferrules from the two connectors carrying the optical fibers to ensure that a high quality optical path is created. Coupling strips 46 can be secured to one another using any suitable means. One possible embodiment uses ultrasonic welding to secure the coupling strips together thereby providing a substantially permanent coupling module.

Housing 44 includes a passage 51 defined by side walls (one side shown) 52 and upper and lower (not shown) walls 54. In addition, housing 44 includes a labeling region 56 and icon region 58 on its front face 59 for identifying connectors. In the embodiment shown, coupling strips 46 are received in passage 51 from the back (i.e., non-face side) of housing 44. Upper and lower walls 54 contain a plurality of lips 60 that engage coupling strip tongues or flanges 62 to secure coupling strips 46 in passage 51.

For securing housing 44 to panel 32 (see FIG. 2A), housing 44 includes a pair of pins 61 (see FIGS. 3A, 4A, 5A and 6A) that rest on ears 57 contained in panel 32 alongside panel openings 38 (see FIGS. 2A and 2B). Housing 44 rotates into position on pins 61 (see, for example distribution module 36f in FIG. 2B) and is secured to the frame by latch 63u, shown best in FIG. 7A. Latch 63u is attached to housing 44 in cantilever fashion such that latch 63 is depressed as housing 44 is received in a panel opening 38. Once latch 63 clears upper panel opening edge 39u (see FIG. 2A), latch 63 springs upward trapping panel opening edge 39u between housing face 59 and ridges 65 (see FIGS. 7A and 10) on latch 63. Alternatively, and as best seen with reference to FIGS. 2A, 7A and 10, housing 44 can be secured to panel 32 by two latches 63u and 63l that allow housing 44 to be pushed directly into panel opening 38 until latch 63u traps panel opening edge 39u and latch 63l traps panel opening edge 39l as described in the foregoing. Latches 63u and 63l include another desirable feature in latch tabs 67. Inasmuch as distribution module can be installed relatively flush with panel 32, as illustrated by distribution module 36a in FIG. 2A, latch tabs 67 offer a convenient mechanism for grasping and operating latches 63u and 63l. Moreover, when removing housing 44 from panel 32, latch tabs 67 provide usefull structure on which to apply a pulling force to effect the removal.

Advantageously, coupling strips 46 are interchangeable and can thus be installed with either strip in communication with connectors on the face 59 of housing 44. Moreover, this symmetry reduces tooling costs as only one type of LC connector strip need be manufactured. Still another cost reduction feature of the instant embodiment is the placement of lips 60 on upper and lower walls 54 rather than designing a more elaborate latching mechanism as part of coupling strips 46. Inasmuch as the number of coupling strips to be manufactured is expected to exceed the number of housings, the reduction in tooling costs stemming from a simpler coupling strip design is significant.

Figure 4A:
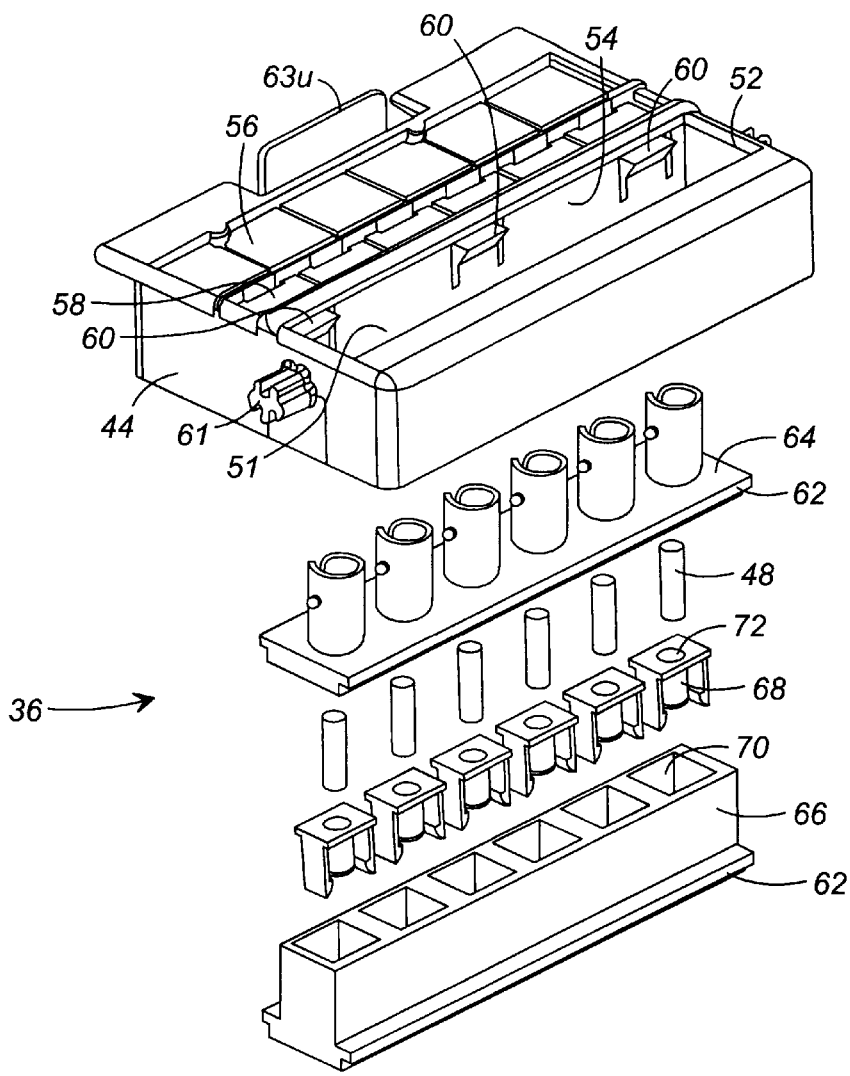
FIG. 4A is an exploded, perspective view illustrating a distribution module using an ST coupling strip and an SC coupling strip.

FIG. 4A illustrates a distribution module 36 in which two different types of coupling strips are to be intalled: an ST coupling strip 64 and an SC coupling strip 66. Because of the design of the SC connector, an SC connector latch 68 is received in each SC connector port 70. As illustrated, SC connector latches 68 are installed individually in SC coupling strip 66; however, SC connector latches 68 can be molded as a single strip to correspond with SC ports 70 to reduce manufacturing costs and to reduce assembly time.

Figure 4B:
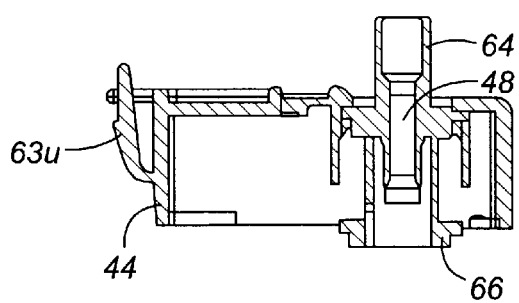
FIG. 4B is a cross-sectional view of a distribution module with an ST coupling strip and an SC coupling strip installed.

ST coupling strip 64 and SC coupling strip 66 are assembled substantially as described hereinbefore with respect to LC coupling strips 46 shown in FIG. 3A. The difference here being that sleeves 48 are received and retained in SC connector latch holes 72 and ST coupling strip holes 74 (see FIG. 6A) when coupling strips 64 and 66 are joined thereby entrapping sleeves 48 and SC connector latches 68 as shown in FIGS. 4A and 4B. The joined coupling strips are received and retained in passage 51 in the same manner as described hereinbefore with respect to FIG. 3A.

The symmetrical nature of the coupling strips, in that either ST coupling strip 64 or SC coupling strip 66 can be installed to communicate with connectors at the front face 59 of housing 44, provides great flexibility in configuring distribution module 36 to couple connectors comprising a plurality of connector types on either side of panel 32.

Figure 5A:
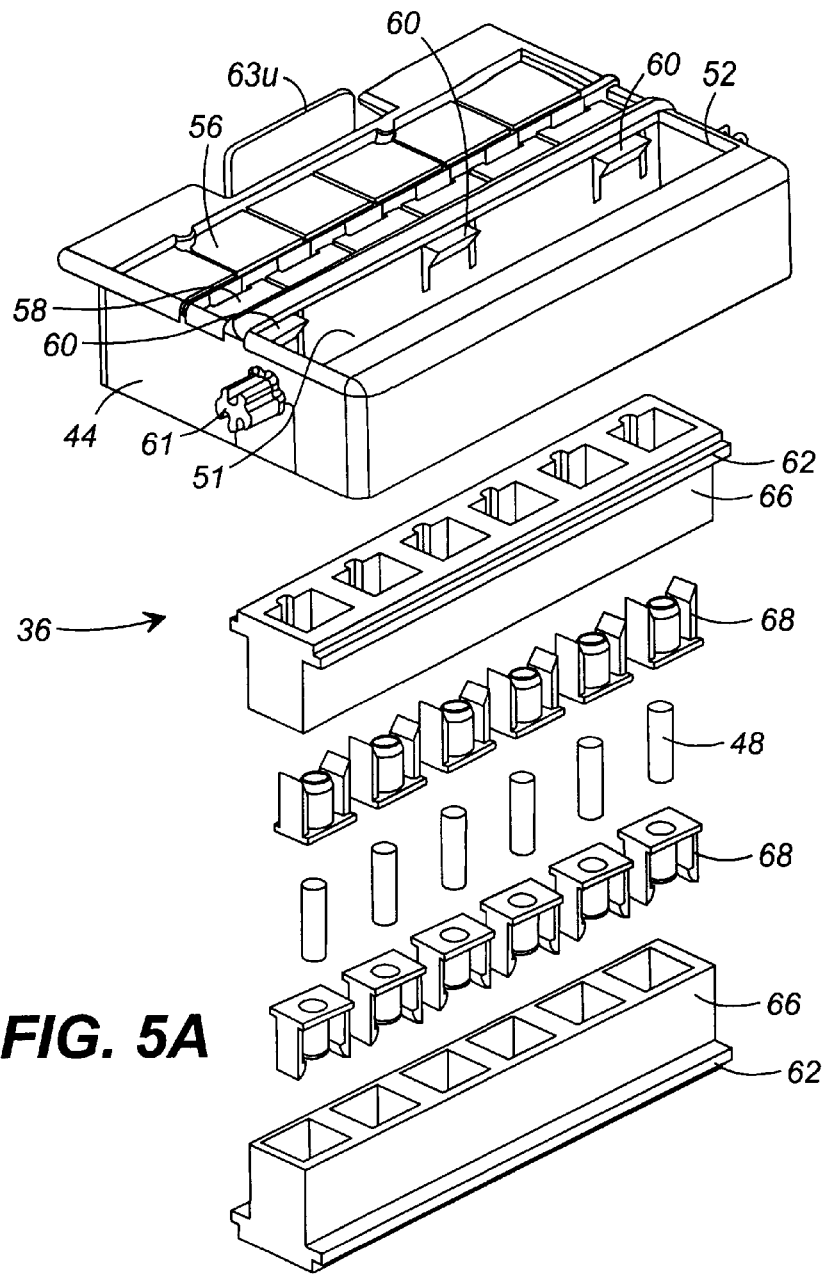
FIG. 5A is an exploded, perspective view illustrating a distribution module using SC coupling strips.
Figure 5B:
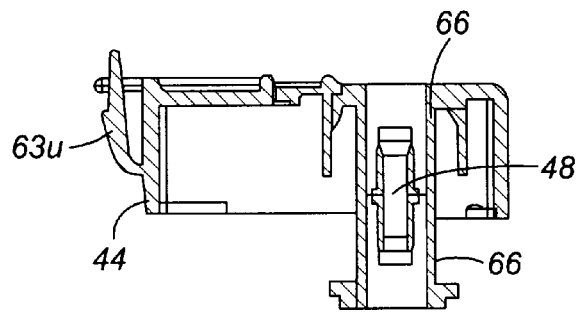
FIG. 5B is a cross-sectional view of a distribution module with SC coupling strips installed.

FIGS. 5A and 5B show a distribution module configured in an SC duplex arrangement. That is, two SC coupling strips 66 are used along with a plurality of SC connector latches 68. Again, the SC connector latches 68 can be molded as a single strip to reduce manufacturing costs and assembly time.

Figure 6A:
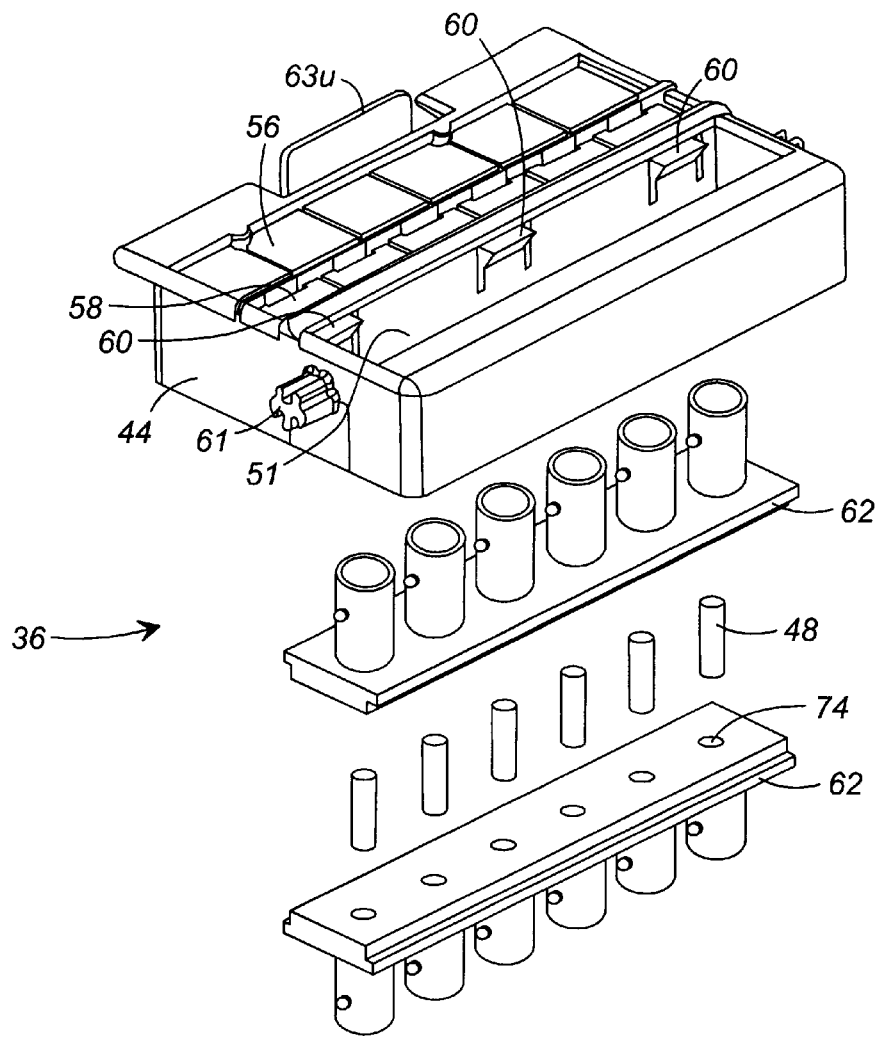
FIG. 6A is an exploded, perspective view illustrating a distribution module using ST coupling strips.
Figure 6B:
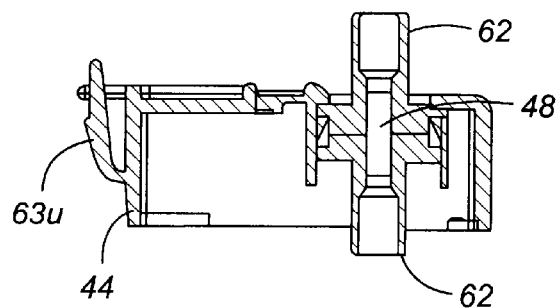
FIG. 6B is a cross-sectional view of a distribution module with ST coupling strips installed.

Similarly, FIGS. 6A and 6B show a distribution module configured in an ST duplex arrangement.

As set forth in FIGS. 3 through 6, those skilled in the art will recognize that the present invention can be used with fiber optic couplings other than ST, SC and LC couplings. Moreover, it is envisioned that electrical coupling strips providing coaxial coupling functionality (i.e., BNC or F type) or coupling strips for multi-pin copper connectors (i.e., RJ11, RJ14, RJ45) could also be used in the instant invention. The present description should, therefore, be understood to be an illustration of exemplary embodiments, but it should not be regarded as limiting the invention to use only the couplings explicitly described herein.

Figure 7A:
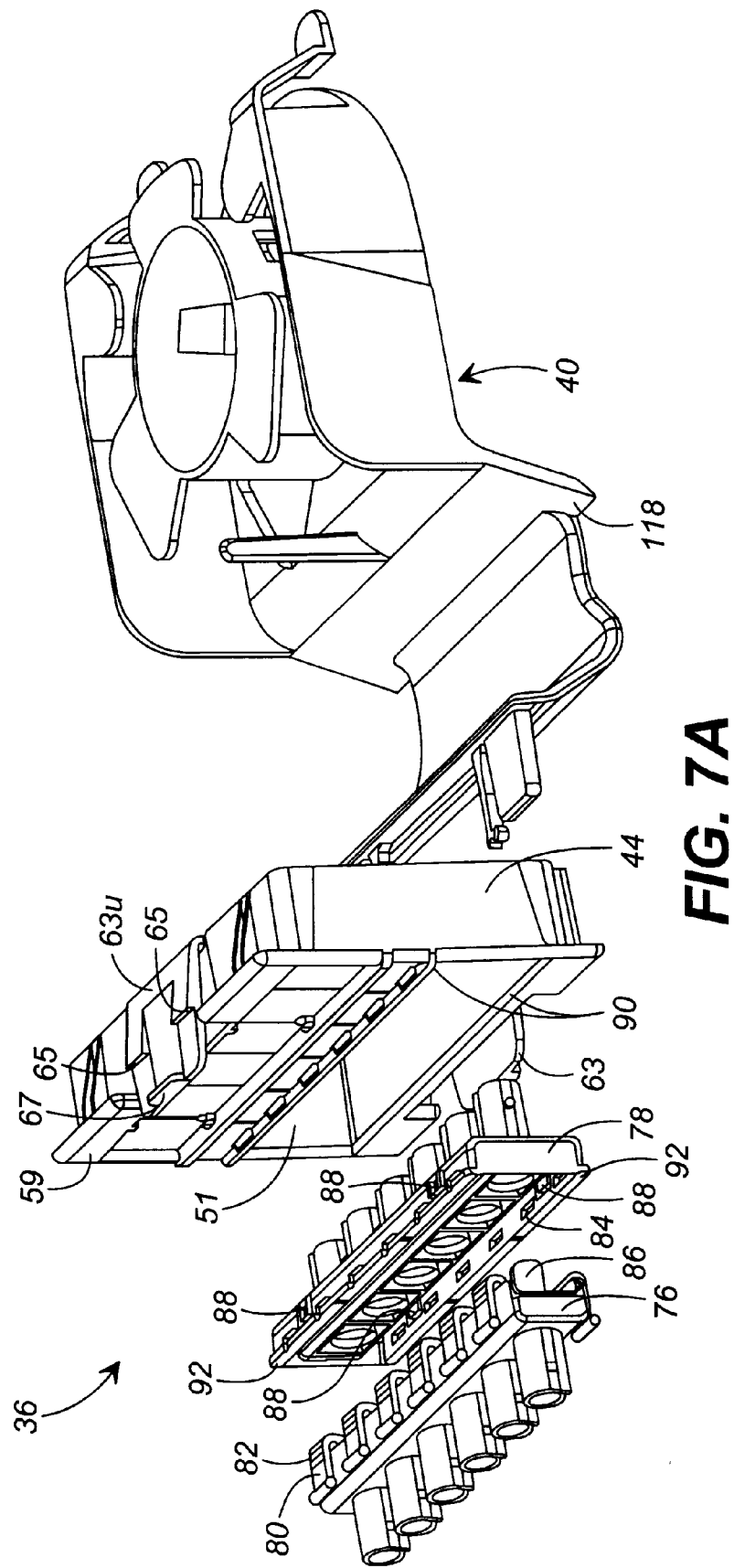
FIG. 7A is an exploded, perspective view illustrating an alternative embodiment of ST coupling strips and a slack tray for use with the distribution module.
Figure 7B:
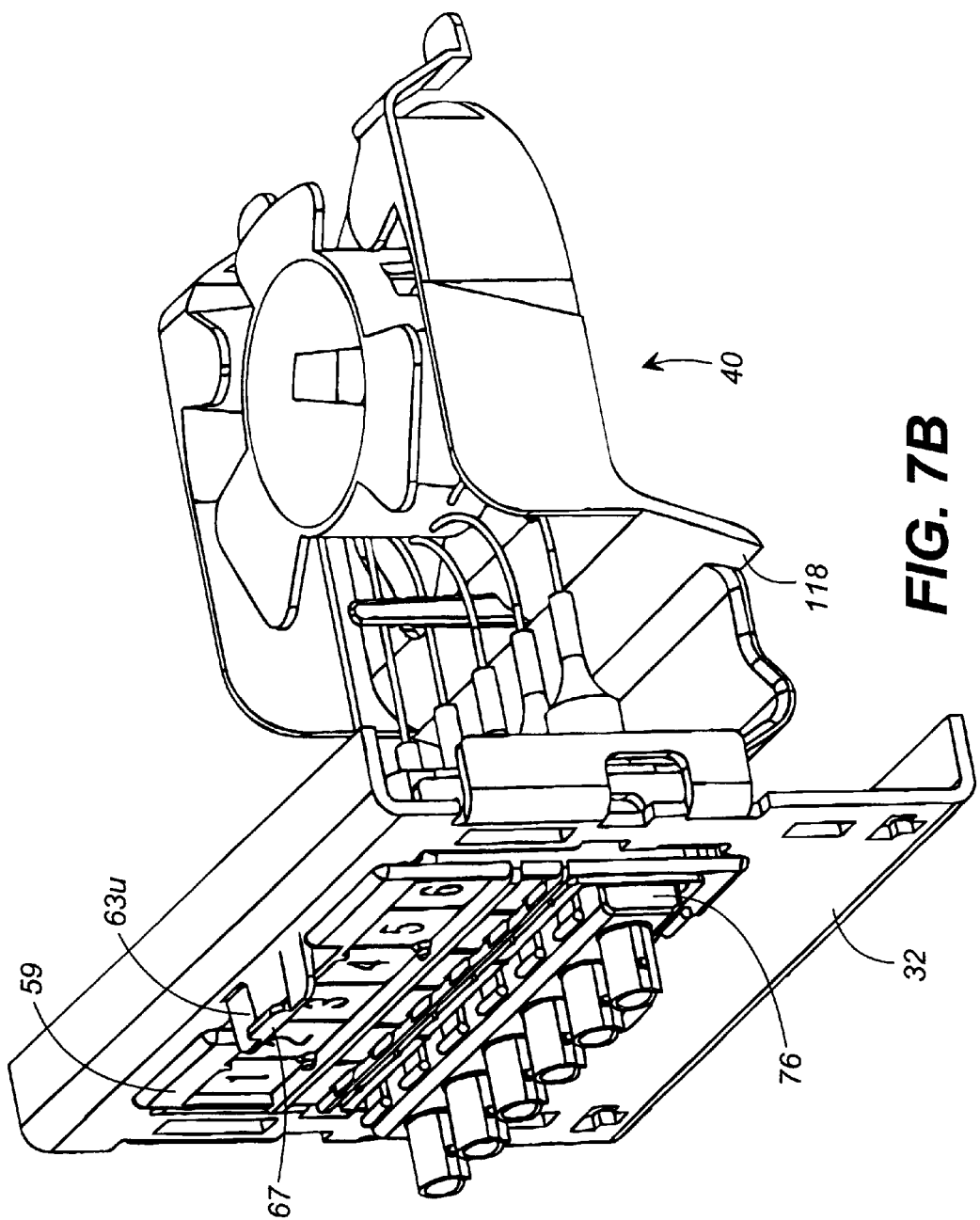
FIG. 7B is a perspective view illustrating the ST coupling strips and slack tray shown in FIG. 7A installed in the distribution module.

With reference to FIG. 7A an alternative embodiment of ST coupling strips is illustrated along with slack tray 40. This approach to a multi-port optical coupler was first disclosed in copending application entitled "OPTICAL FIBER COUPLING BUILDOUT SYSTEM," U.S. Ser. No. 08/857,402, is now patented, U.S. Pat. No. 5,896,477, by Stephenson, et al., which is incorporated herein by reference. Specifically, the ST coupling strips comprise an ST cap strip 76 and an ST base strip 78. ST cap strip 76 has a plurality of clips 80 disposed along its top and bottom surfaces. Each clip 80 has a tab 82 for securing cap strip 76 to base strip 78. In addition, cap strip 76 includes a plurality of sleeve retainers 86 for each ST port to hold the alignment sleeves 48 (see FIGS. 3 through 6). The mechanism by which sleeve retainers 86 hold alignment sleeves 48 is the subject of copending application entitled "SLEEVE HOUSING FOR OPTICAL COUPLING BUILDOUT," U.S. Ser. No. 08/857,841, is now patented, U.S. Pat. No. 5,838,855, by Stephenson, which is incorporated herein by reference. ST base strip 78 is designed with ST ports large enough to receive sleeve retainers 86 and includes a plurality of complementary holes 84 for receiving tabs 82. To assemble cap strip 76 to base strip 78, cap strip 76 and base strip 78 are pressed together thereby compressing clips 80 towards the body of cap strip 76 to allow cap strip 76 to be fully received in base strip 78. Once in position, clips 80, being elastic and having a physical memory, spring back to their uncompressed position allowing tabs 82 to enter holes 84 securing cap strip 76 to base strip 78. Similarly, base strip 78 is secured to housing 44 via tabs 88. As base strip 78 is positioned into passage 51 from the face 59 side of housing 44, tabs 88 are depressed as they engage edges 90 at the entrance to said passage 51. Once, ST passage edge 90 clears tabs 88, tabs 88 spring upward trapping passage edges 90 between themselves and ST base lips 92. FIG. 7B shows distribution module 36 with ST cap strip 76 and ST base strip 78 assembled along with an accompanying slack tray 40.

Advantageously, and in contrast with the coupling strip embodiments discussed hereinbefore, cap strip 76 can be removed from base strip 78 by simply squeezing clips 80 to disengage tabs 82 from holes 84 and pulling the two strips apart. This is a significant advantage for applications where it is desirable to have a cleaning capability of the internals of the coupling strips. Furthermore, the cleaning process is greatly simplified as only the connectors on cap strip 76 need be removed to clean alignment sleeves 48 and sleeve retainers 86 when cap strip 76 is removed from base strip 78. The connectors attached to base strip 78 can remain intact through the cleaning process. This substantially reduces the time and corresponding labor costs incurred in cleaning alignment sleeves 48 and sleeve retainers 86.

Figure 8A:
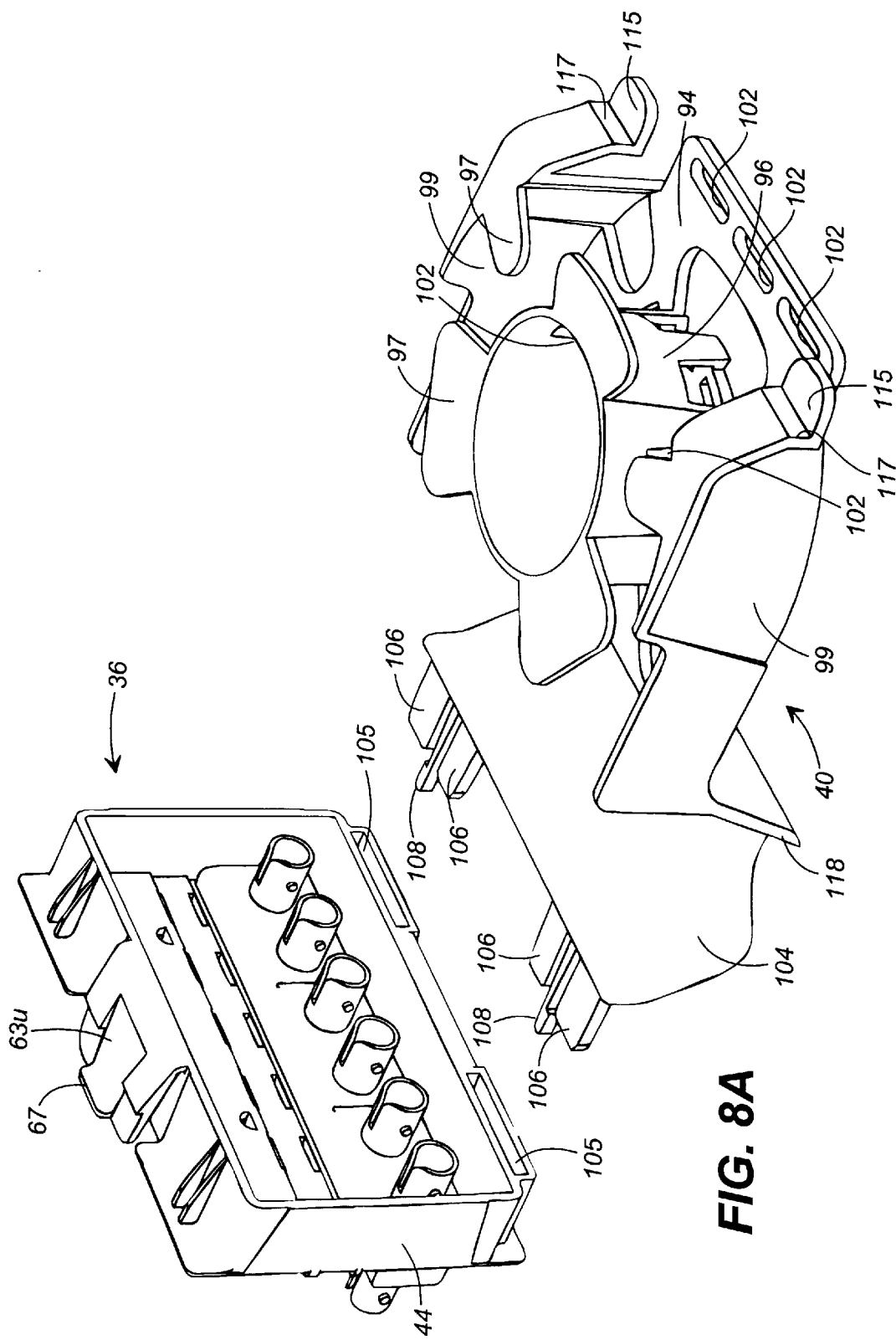
FIG. 8A is a perspective view illustrating the installation of the slack tray in the distribution module.
Figure 8B:
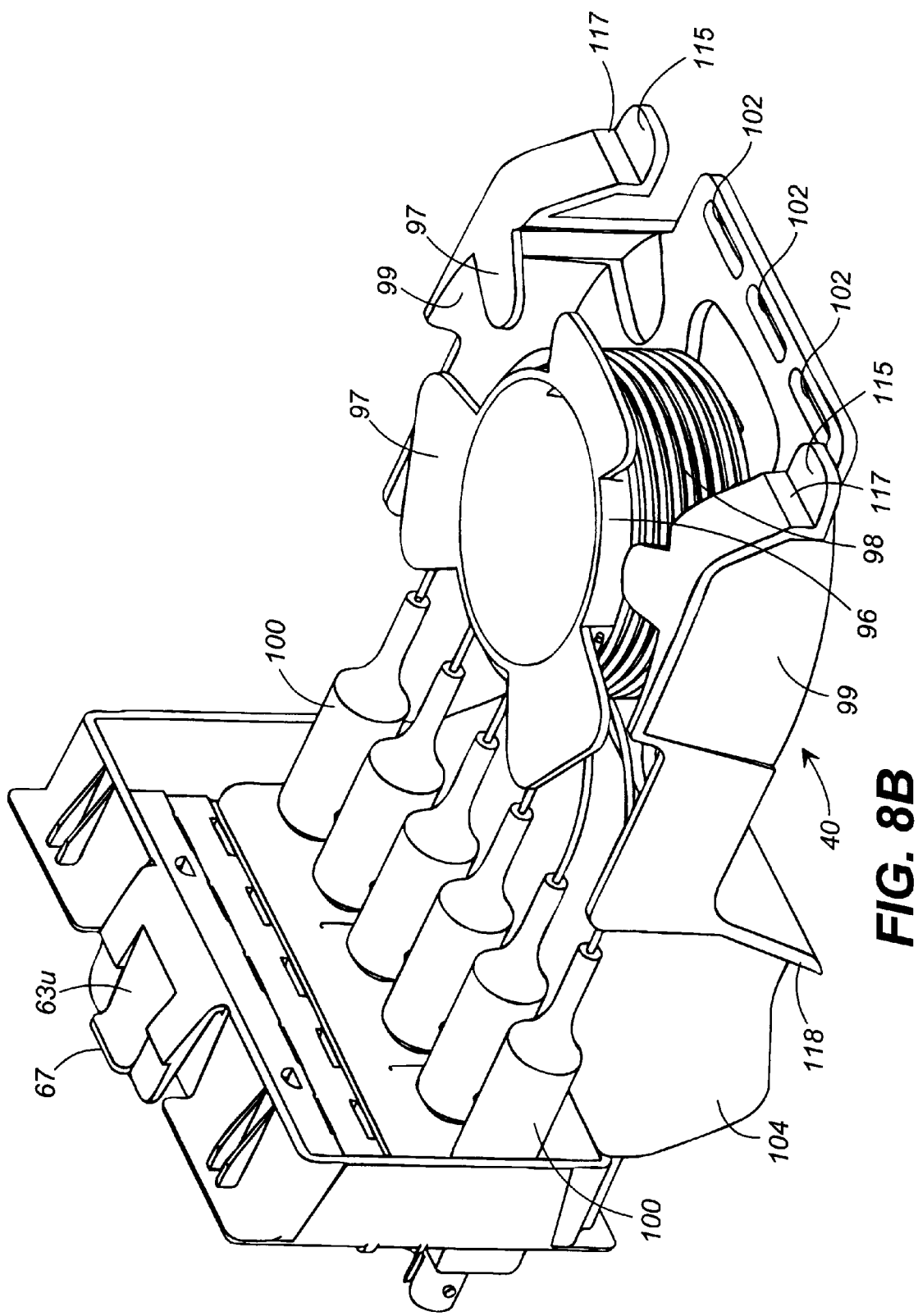
FIG. 8B is a perspective view of the slack tray installed in the distribution module with buffered fiber spooled around the drum.

FIGS. 8A through 8C illustrate the use of an optional slack tray 40 in conjunction with distribution module 36. It is envisioned that distribution module 36 will generally be used to provide optical coupling functionality; however, as discussed in the foregoing, it is also envisioned that electrical coupling strips could be used in distribution module 36. Slack tray 40 would likely be unnecessary for many electrical applications, such as coaxial cable, because of electrical cable's more rugged nature. However, slack tray 40 provides important protection for fragile optical cable.

With reference now to FIG. 8A, a slack tray 40 for use with distribution module 36 will now be described. Slack tray 40 is comprised of a base 94 from which a drum 96 rises for spooling buffered fiber 98 as shown in FIG. 8B (see also FIG. 1 showing buffered fiber 26) and side walls 99. To assist in spooling the buffered fiber onto drum 96, side walls 99 and drum 96 are designed with several wings 97 that guide the buffered fiber onto drum 96 and aid in retaining the buffered fiber on drum 96 once it is spooled. Moreover, side walls 99 provide similar assistance in guiding and retaining the fiber. It will be appreciated by those skilled in the art that the outer jacket of optical cable is stripped to make a connection with connector boots 100 as shown in FIG. 8B. Advantageously, slack tray base 94 includes a plurality of apertures 102 through which cable ties can be used to secure the jacketed cable at the end opposite the distribution module to ensure that cable movement or disturbance external to slack tray 40 is not transmitted to the buffered fiber 98. Additional apertures 102 are included in base 94 within drum 96 and in the walls of drum 96 for even greater flexibility in securing the cable, either jacketed or buffered, via cable ties. Slack tray 40 further includes a spillway region 104, which will be discussed more fully hereinafter with reference to FIG. 8C. Distribution module housing 44 includes a pair of slots 105 for receiving bifurcated mounting tabs 106. A latch arm 108 runs between each bifurcated mounting tab 106 to hook over an internal lip in slots 105 to secure slack tray 40 to housing 44 as shown in FIG. 8B. It will be appreciated by those skilled in the art that a single mounting tab and slot combination could be used in the alternative to further reduce manufacturing costs.

As is known in the art, optical cable and buffered fiber cannot be bent at extreme angles as the protective sheathing and/or the fiber itself could be bent sufficiently to cause at least some of the light to escape the waveguide. Generally, cable and fiber manufacturers will specify the minimum bend radius for both jacketed and buffered fiber. A common standard used for jacketed fiber is that the minimum bend radius be at least ten times the cable diameter. For buffered fiber, the manufacturers specifications should be consulted before spooling buffered fiber onto drum 96. Alternative embodiments may use modular drums 96 of varying diameters to accommodate fiber types having disparate bend qualities.

The unique design of spillway region 104 is shown best in FIG. 8C. Spillway region 104 is preferably shaped to form a trough below connector boots 100. This trough provides room for a technician's fingers when manipulating connector boots 100 on the back side of distribution module 36.

Figure 9:
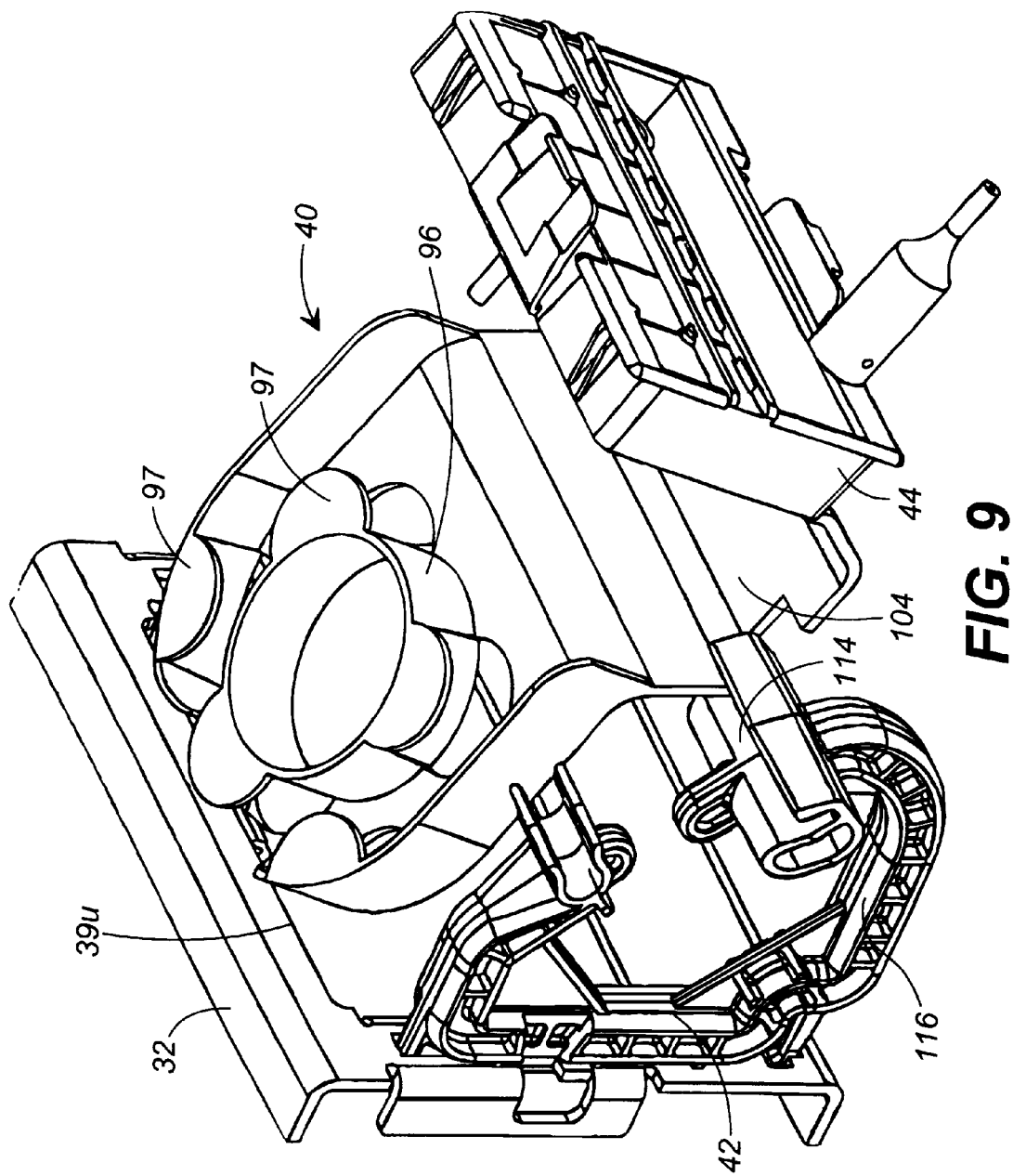
FIG. 9 is a perspective view illustrating an alternative installation of the distribution module and slack tray on the front of an electrical cable panel.

FIG. 9 illustrates an alternative mounting arrangement for distribution module housing 44 and slack tray 40 that provides front panel access to both sides of distribution module 36 (see also FIG. 2A, distribution module 36b). This mounting arrangement will most frequently be used as a service position that provides easy access to both sides of distribution module 36 for connector reconfiguration. As best seen in FIG. 2A, panel 32 includes a set of three retainer mount holes 110a, 110b, 110c positioned alongside panel openings 38. Retainer 42 has three prongs 112a, 112b and 112c positioned to correspond to retainer mount holes 110a, 110b and 110c. Prong 112a is inserted first with prong 112b essentially acting as an alignment guide. Mount hole 110c is preferably shaped to be wider at the top and narrower at the bottom. This geometry allows prong 112c to slip into the wide portion of mount hole 110c but not the narrow portion. Thus, retainer 42 is locked into position by placing upward pressure on prong 112c to allow entry into the wide portion of mount hole 110c and then releasing prong 112c to allow the narrow shaft of prong 112c to spring into the narrower, bottom portion of mount hole 110c. Shown best in FIGS. 7A, 7B, 8A and 8C, slack tray 40 has a pair of shoulders 118 that rest in retainer slots 114 as seen in FIG. 9. Retainer slots 114 are preferably of sufficient width to support two slack trays positioned side by side as illustrated in FIG. 2A. Slack tray 40 is secured to panel 32 by hooking feet 115 (see FIGS. 8A and 8B) under upper panel edge 39u slightly compressing legs 117 such that slack tray 40 is effectively wedged between upper panel edge 39u and retainer slots 114. In addition, retainer arm 116 can be used to collect both in service and out of service patch cables to prevent them from becoming entangled. As is readily seen from FIG. 9, this front panel mounting arrangement allows a technician to quickly unsnap distribution module 36 from its operative position in panel 32 and place distribution module 36 into a maintenance position on retainer 42. In this maintenance position, the technician enjoys easy access to both sides of distribution module 36 substantially reducing labor time and cost for applications requiring frequent cable reconfiguration. Furthermore, the technician is provided with another option in arranging panels in a telecommunications closet as a panel can now be mounted substantially flush with a wall and the distribution modules 36 placed into operation while held on retainers 42, which is their normal maintenance position.

Figure 10:
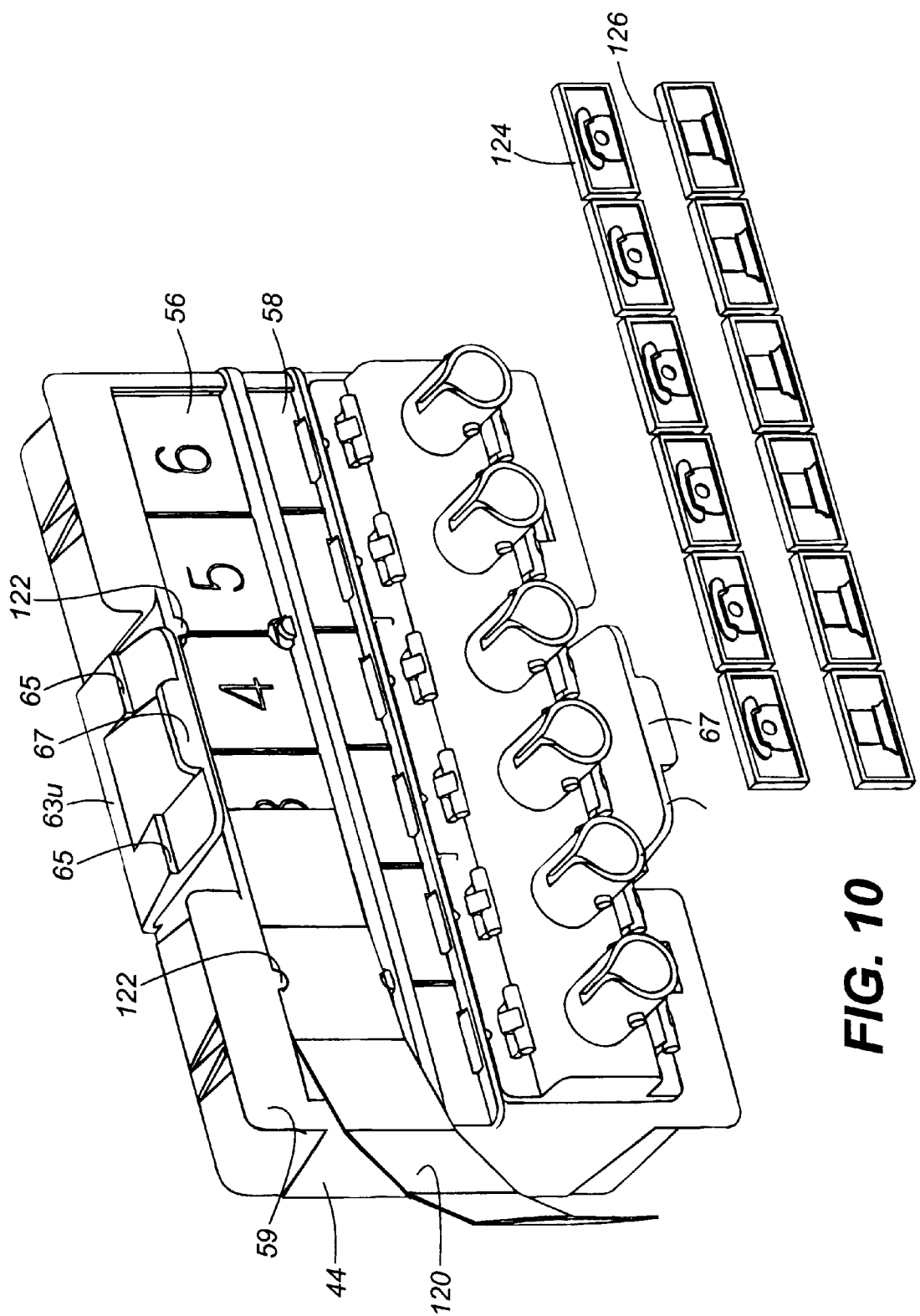
FIG. 10 is a perspective view of a distribution module illustrating the labeling strip and the icons.

Inasmuch as multiple connectors are coupled in a single distribution module, it is desirable to provide a mechanism for marking and identifying a particular connector. Accordingly, distribution module housing 44 has a labeling region 56 positioned above the coupling strips that sequentially number the individual ports from left to right as shown in FIG. 10. Furthermore, labeling region 56 is recessed from housing face 59 so that a user definable labeling strip 120, made from a flexible cardboard or paper, can be inserted over labeling region and held via tabs 122.

A second labeling mechanism is provided via icon region 58. Again, icon region 58 is positioned above the coupling strips and is designed to receive individual icons identifying the nature of the connection using a particular port. For example, telephone icons 124 can be used to identify a port as connecting voice or telephone service. Similarly, a computer icon 126 can be used to identify a port as connecting data or computer service or a television icon (not shown) can be used to identify a port as connecting cable television service.

The principles of the invention have been illustrated herein as they are applied to a distribution module for use in an optical or electrical panel. From the foregoing, it can readily be seen that the distribution module is highly versatile in that it can be used to couple both optical and electrical connectors through the use of high density coupling strips in the same panel. Advantageously, the distribution module can be used in a traditional electrical coupling panel thereby providing a means for integrating both electrical and optical coupling functionality in the same panel. Such integration allows technicians to reuse panels independent of the cable type. The use of high density coupling strips significantly minimizes the technician's installation and configuration time when compared to the simplex or duplex coupling systems known heretofore. A slack tray can be used with the distribution module to protect the exposed, buffered fiber from potential damage. Moreover, through use of a retainer, the slack tray and distribution module can be mounted on the front of a panel, which is a highly convenient maintenance position for technicians when connectors are frequently reconfigured or when access to the rear of a panel is limited by choice or necessity.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

We claim:

1. A cable distribution module for interconnecting first and second transmission cables in a panel, the panel having at least one opening formed therethrough, said cable distribution module comprising:
   a housing having a front, a back, a passage defined therethrough, and an exterior side wall extending between said front and said back, said housing being sized and shaped to be inserted in the opening of the panel, said passage being defined by upper and lower opposing walls;
   a first coupling strip having a plurality of cable coupling ports arranged in a side-by-side configuration with each other, each of said cable coupling ports being adapted to engage the first transmission cable, said first coupling strip being configured to engage said housing within said passage;
   a second coupling strip engaging said first coupling strip in a back-to-back configuration, said second coupling strip having an exterior which is symmetrical to the exterior of said first coupling strip and having a plurality of cable coupling ports arranged in a side-by-side configuration with each other such that each of said cable coupling ports of said second coupling strip complement one of said cable coupling ports of said first coupling strip, each of said cable coupling ports of said second coupling strip being adapted to engage the second transmission cable, said second coupling strip being configured to engage said housing within said passage,
   said first and second coupling strips being configured to engage said housing within said passage in a first position and a second position such that, in said first position said cable coupling ports of said first coupling strip are arranged adjacent said front of said housing and said cable coupling ports of said second coupling strip are arranged adjacent said back of said housing, and in said second position said cable coupling ports of said second coupling strip are arranged adjacent said front of said housing and said cable coupling ports of said first coupling strip are arranged adjacent said back of said housing.

2. The distribution module of claim 1, wherein said housing has a pair of opposing pins, each of said pins extending outwardly from said exterior side wall of said housing, said pins being configured to pivotably engage the panel such that said housing is pivotable relative to the panel.

3. The distribution module of claim 1, wherein each of said upper and lower walls of said passage has a lip extending therefrom and into said passage, and wherein said first and second coupling strips each has flanges extending outwardly therefrom, each of said flanges being configured to engage one of said lips such that engagement of said flanges with said lips secures said first and second coupling strips to said housing within said passage.

4. The distribution module of claim 1, further comprising:
   a cable slack tray extending outwardly from said back of said housing, said cable slack tray having a base and a spillway region arranged between said base and said housing, said base having an upper surface and a substantially cylindrical drum extending from said upper surface, said drum configured for spooling cable thereon, said spillway region configured as a trough extending below said base and said housing for facilitating engagement of the second cable with one of said cable coupling ports arranged adjacent said back of said housing.

5. The distribution module of claim 4, wherein said cable slack tray is removably mountable to said housing, said cable slack tray having a bifurcated mounting tab extending therefrom, said bifurcated mounting tab having a latch arm, and wherein said housing has a slot with an internal lip formed therein at said back of said housing, said internal slot being configured to receive said bifurcated mounting tab such that insertion of said bifurcated mounting tab within said slot allows said latch arm to engage said internal lip such that engagement of said latch arm with said internal lip secures said cable slack tray to said housing.

6. The distribution module of claim 4, wherein said drum has an upper edge and a wing attached thereto, said wing extending outwardly from said drum and forming a barrier for retaining cable on said drum.

7. The distribution module of claim 4, wherein said cable slack tray has strain relief means for securing a cable to said cable slack tray.

8. The distribution module of claim 7, wherein said strain relief means is an aperture in said cable slack tray through which the cable can be tied with a cable tie.

9. The distribution module of claim 1, wherein said housing has
   a labeling region on said front for identifying said cable coupling ports; and
   an icon region on said front for identifying said cable coupling ports.

10. The distribution module of claim 1, further comprising:
    a plurality of ferrule alignment sleeves, wherein each said sleeve is entrapped between one of said cable coupling ports in said first coupling strip and a complementary said coupling port in said second coupling strip.

11. The distribution module of claim 1, wherein said first coupling strip is a base coupling strip and said second coupling strip is a cap coupling strip.

12. The distribution module of claim 1, wherein each of said cable coupling ports of said first coupling strip is configured as one of the group consisting of ST, SC, LC and FC optical couplers, and each of said cable coupling ports of said second coupling strip is configured as one of the group consisting of ST, SC, LC and FC optical couplers.

13. The distribution module of claim 1, wherein said cable coupling ports of said first and second coupling strips are configured as coaxial electrical couplers.

14. A cable panel for interconnecting first and second transmission cables, said cable panel comprising:
    a panel having a panel front, a panel back, and an opening formed therethrough, and;
    a cable distribution module engaging said panel and movable between a mounted position and a retained position, in said mounted position said cable distribution module being securely mounted within said opening of said panel, in said retained position said cable distribution module being retained in a spaced orientation with said front of said panel, said cable distribution module having a housing, a first coupling strip and a second coupling strip;

said housing having a housing front, a housing back, a passage defined therethrough, and an exterior side wall extending between said housing front and said housing back, said housing being sized and shaped to be inserted in said opening of said panel, said passage being defined by upper and lower opposing walls;

said first coupling strip being configured to engage said housing within said passage, said first coupling strip having a plurality of cable coupling ports arranged in a side-by-side configuration with each other, each of said cable coupling ports being adapted to engage the first transmission cable;

a second coupling strip engaging said first coupling strip in a back-to-back configuration and being configured to engage said housing within said passage, said second coupling strip being symmetrical to said first coupling strip and having a plurality of cable coupling ports arranged in a side-by-side configuration with each other such that each of said cable coupling ports of said second coupling strip complement one of said cable coupling ports of said first coupling strip, each of said cable coupling ports of said second coupling strip being adapted to engage the second transmission cable;

said first and second coupling strips being configured to engage said housing within said passage in a first position and a second position such that, in said first position said cable coupling ports of said first coupling strip are arranged adjacent said housing front and said cable coupling ports of said second coupling strip are arranged adjacent said housing back, and in said second position said cable coupling ports of said second coupling strip are arranged adjacent said housing front and said cable coupling ports of said first coupling strip are arranged adjacent said housing back.

15. The cable panel of claim 14, wherein said exterior side wall of said housing has a pair of opposing pins extending outwardly therefrom, said pins being configured to pivotably engage said panel such that, in said mounted position, said cable distribution module is pivotable relative to said panel.

16. The cable panel of claim 14, wherein said housing has a cable slack tray extending outwardly therefrom, said cable slack tray having a base and a spillway region arranged between said base and said housing back, said base having an upper surface and a substantially cylindrical drum extending from said upper surface, said drum configured for spooling cable thereon, said spillway region configured as a trough extending below said base and said housing for facilitating engagement of the second cable with one of said cable coupling ports arranged adjacent said housing back.

17. The cable panel of claim 14, wherein each of said cable coupling ports are configured as couplers selected from the group consisting of: ST, SC, LC and FC optical couplers, and; coaxial electrical couplers.

18. The cable panel of claim 16, wherein said panel has a retainer extending outwardly from said panel front, and wherein said cable slack tray has a shoulder such that engagement of said shoulder with said retainer retains said cable distribution module in said retained position.

* * * * *